UNITED STATES PATENT OFFICE.

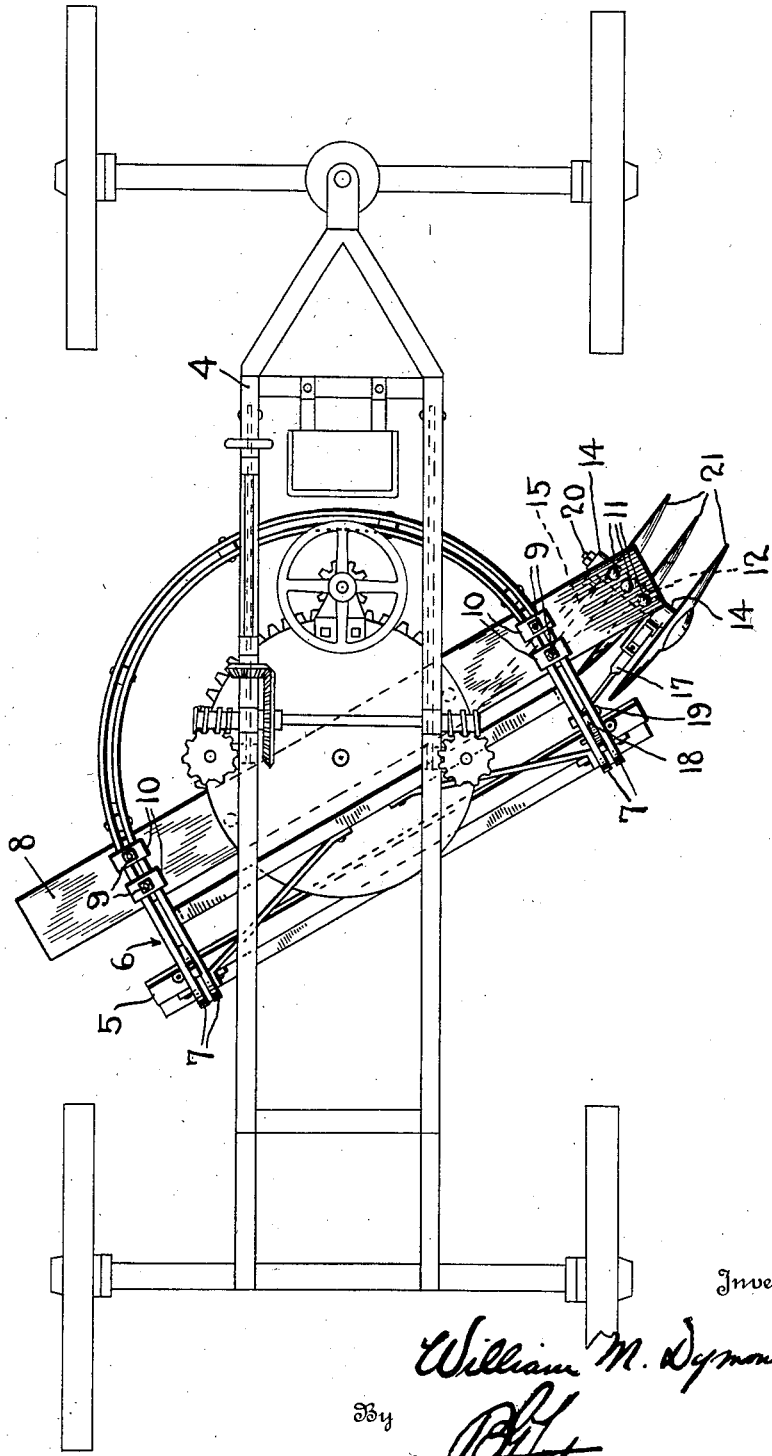

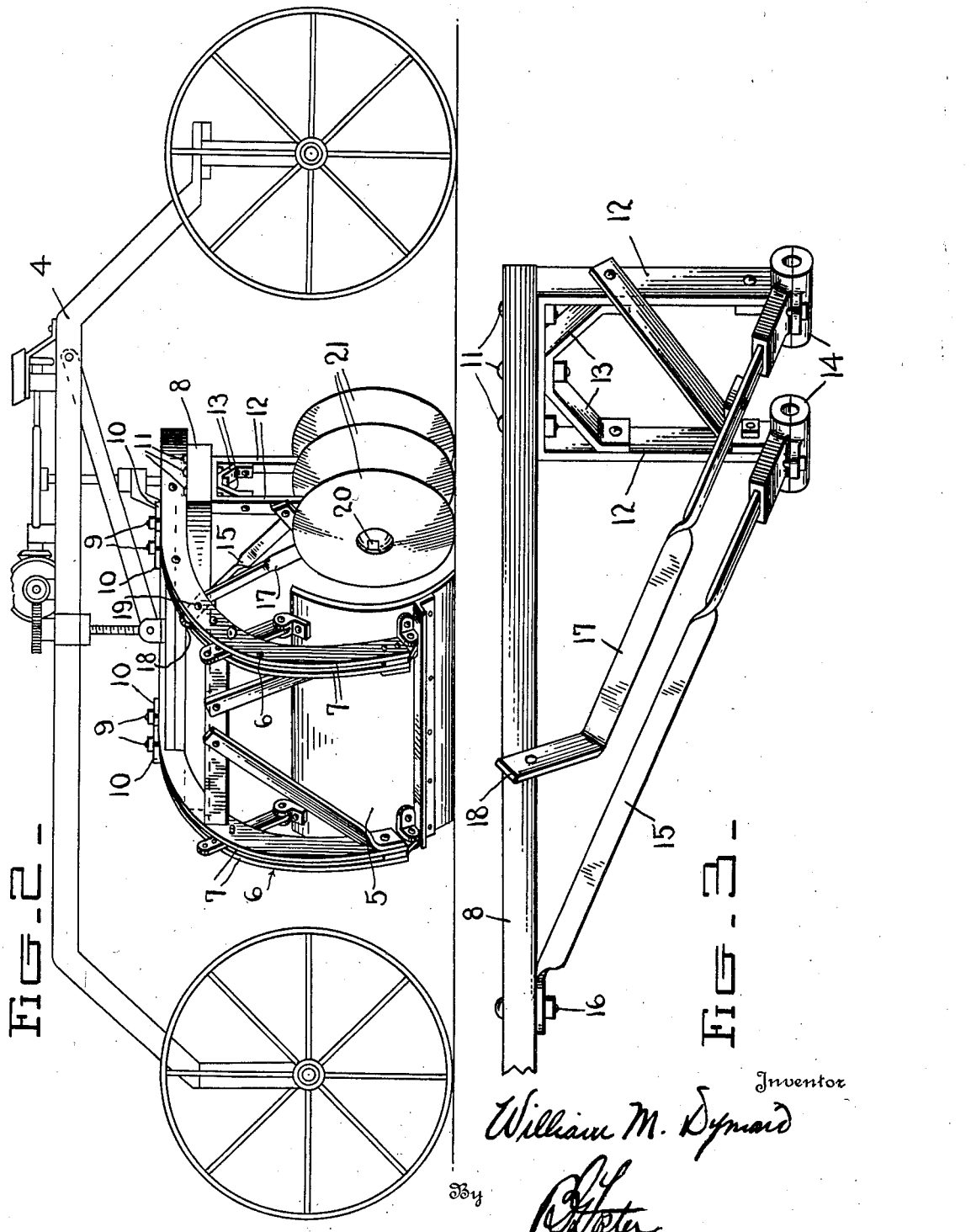

WILLIAM M. DYMOND, OF NORTH PLATTE, NEBRASKA.

ATTACHMENT FOR ROAD-SCRAPERS.

1,213,169.  Specification of Letters Patent.  Patented Jan. 23, 1917.

Application filed August 5, 1916. Serial No. 113,374.

*To all whom it may concern:*

Be it known that I, WILLIAM M. DYMOND, a citizen of the United States, residing at North Platte, in the county of Lincoln and State of Nebraska, have invented certain new and useful Improvements in Attachments for Road-Scrapers, of which the following is a specification.

The present invention relates to means for cutting and loosening the ground in advance of the blade of a road or other scraper, particularly that of the wheeled type.

One of the principal objects is to provide a simple device that may be in the form of an attachment, and which can be readily secured in place and will effectively operate to obtain the above stated objects, the structure being such that no material alteration need be made in the scraping apparatus in order to attach the cutter.

An embodiment of the invention that has proven satisfactory, is illustrated in the accompanying drawings, wherein:—

Figure 1 is a plan view indicating in outline a wheeled scraper, and illustrating the attachment in place thereon. Fig. 2 is a side elevation of the same. Fig. 3 is a detail perspective view of a portion of the supporting bar and bracket.

Similar reference numerals designate corresponding parts in all the figures of the drawings.

In the embodiment illustrated, the scraping apparatus, which may be of any desired type, is designated generally by the reference numeral 4, and the scraping blade of the usual form, is designated 5. This blade is supported on the wheeled frame of the apparatus by spaced arms 6, each of these arms consisting of spaced bars or sections 7. It is believed that no further illustration or description of the apparatus is necessary, as it is well known to those skilled in the art, and no invention is claimed in said apparatus *per se*.

The improvement, in the embodiment disclosed, consists of a bar or beam 8 which is placed across and against the under sides of the arms 7, this bar or beam being secured in place by sets of bolts 9 that pass therethrough and also pass between the sections 7 of the scraper blade supporting arms 6. Clamping plates 10 placed upon the said sections also receive the bolts, clamps being thus formed which will effectively secure the bar in place and yet permit of its being adjusted to the desired position. Depending from the forward end of the supporting bar 8 and secured thereto by bolts 11 is a bracket consisting of a U-shaped bar having depending arms 12 reinforced by suitable braces 13 and terminating at their lower ends in sectional boxes 14. A brace 15, extending from one of the boxes, is bolted, as shown at 16, to the bar 8, while another brace 17, secured to the other box 14, has an offset terminal portion 18 that passes between the section 7 of one of the blade supporting arms 6, and is secured thereto by a bolt 19. Mounted in the boxes 14 is a shaft 20 carrying a plurality of rotatable cutting disks 21, these cutting disks, as shown in Figs. 1 and 2, being disposed in advance of the front end of the scraper blade 5, and at an inclination thereto and to the direction of movement of the apparatus. It will be obvious that with this device in place, when the scraper is drawn over a roadway or other surface, the disks 21 will cut and pulverize the ground in advance of the blade 5, thereby loosening the same, so that the blade is relieved of considerable work; the draft upon the team or teams is lightened, and better results are secured. As already stated, it will be noted that the device can be easily placed in position and is applicable to practically all well known types of scrapers now in use of which I am aware. Moreover, by securing it directly to the blade supporting arms, it is adjusted with the blade.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In an attachment for scrapers, comprising a bar, means for attaching the bar directly to and across the supporting arms of a scraper blade, and a cutter supported on the bar and adapted to be positioned thereby in advance of the scraper blade.

2. In an attachment for scrapers, comprising a bar, spaced clamps for attaching the bar directly to and across the supporting arms of a scraper blade, a depending bracket carried by one end of the bar, and cutter disks journaled on the bracket.

3. In an attachment for scrapers, comprising a bar, spaced clamps for attaching the bar directly to and across the supporting arms of a scraper blade, a depending bracket comprising spaced depending arms having shaft boxes and braces connected to the boxes, and a rotary cutting member mounted in the boxes.

4. In an attachment for scrapers, comprising a bar, spaced clamps for attaching the bar directly to and across the supporting arms of a scraper blade, a depending bracket comprising spaced depending arms having shaft boxes, a brace connecting one of the boxes to the bar, a brace connected to the other box and arranged to engage one of the scraper supporting arms, and rotary cutters mounted in the boxes.

5. The combination with a wheeled frame, of a scraper blade, spaced arms connected to the blade for supporting the same on the frame, a bar extending across the blade supporting arms, means for clamping the bar to the arms, and cutting means suspended from one end of the bar and disposed in advance of the forward end of the blade.

6. The combination with a wheeled frame, of a scraper blade, spaced arms connected to the blade for supporting the same in the frame, and each comprising spaced sections, a bar extending across the blade supporting arms, clamping bolts for the bar passing between the sections of the arms, a bracket suspended from one end of the bar, a brace connected to the bracket and engaged between the sections of one of the blade supporting arms, and rotatable cutting disks journaled on the bracket and disposed in advance of the forward end of the blade.

In testimony whereof I affix my signature in the presence of two witnesses.

WILLIAM M. DYMOND.

Witnesses:
J. E. SEBASTIAN,
A. M. ANTHONY.